United States Patent
Chmiel et al.

(10) Patent No.: US 8,300,587 B2
(45) Date of Patent: Oct. 30, 2012

(54) INITIALIZATION OF REFERENCE SIGNAL SCRAMBLING

(75) Inventors: Mieszko Chmiel, Wroclaw (PL); Peng Chen, Beijing (CN); Tommi Tapani Koivisto, Espoo (FI); Xiang Guang Che, Beijing (CN); Timo Eric Roman, Espoo (FI)

(73) Assignee: Nokia Corporation, Espoo (FI)

(*) Notice: Subject to any disclaimer, the term of this patent is extended or adjusted under 35 U.S.C. 154(b) by 197 days.

(21) Appl. No.: 12/715,353

(22) Filed: Mar. 1, 2010

(65) Prior Publication Data

US 2011/0038310 A1    Feb. 17, 2011

Related U.S. Application Data

(60) Provisional application No. 61/247,239, filed on Sep. 30, 2009.

(51) Int. Cl.
*H04W 4/00* (2009.01)
*H04J 3/16* (2006.01)

(52) U.S. Cl. ......................... 370/329; 370/437

(58) Field of Classification Search .................. 370/328, 370/329, 437
See application file for complete search history.

(56) References Cited

U.S. PATENT DOCUMENTS

| 2002/0138721 A1 | 9/2002 | Kwon et al. | |
| 2003/0169702 A1* | 9/2003 | Ryu et al. | 370/320 |
| 2009/0238064 A1* | 9/2009 | Lee et al. | 370/208 |

FOREIGN PATENT DOCUMENTS

| EP | 1740008 A1 | 1/2007 |
| EP | 2104295 A2 | 9/2009 |
| WO | 2007051190 A1 | 5/2007 |

OTHER PUBLICATIONS

3GPP TR 36.814 V0.4.1(Feb. 2009) Technical Report 3rd Generation Partnership Project; Technical Specification Group Radio Access Network; Further Advancements for E-UTRA Physical Layer Aspects (Release 9).
3GPP WID RP-090359, "Enhanced DL transmission for LTE"TSG-RAN Meeting #43 RP-090359, Biarritz, France, Mar. 3-6, 2009.

(Continued)

*Primary Examiner* — Ronald Abelson
(74) *Attorney, Agent, or Firm* — Harrington & Smith

(57) ABSTRACT

A scrambling sequence is initialized using at least a cell identifier and an offset, and a physical downlink control information DCI is sent to a user equipment which indicates the offset. In more particular embodiments a user equipment-specific reference signal UE-RS is scrambled using the initialized scrambling sequence, and the scrambled UE-RS is sent to the UE for demodulating a downlink shared channel (PDSCH). In another exemplary embodiment the generated UE-RS is sent in a pilot part of a subframe transmission associated with the PDSCH and is for demodulating at least a data part of that subframe transmission. In a specific embodiment from the UE side, the UE receives the UE-RS and the DCI which indicates the offset, descrambles the UE-RS using a scrambling sequence that is initialized using a cell identifier and the indicated offset; and demodulates the PDSCH using the de-scrambled UE-RS.

21 Claims, 5 Drawing Sheets

OTHER PUBLICATIONS

3GPP TS 36.211, v8.7.0, "Evolved Universal Terrestrial Radio Access (E-UTRA); Physical channels and modulation"3GPP TS 36.211 V8.7.0 (May 2009) Technical Specification 3rd Generation Partnership Project; Technical Specification Group Radio Access Network; Evolved Universal Terrestrial Radio Access (E-UTRA); Physical Channels and Modulation (Release 8).

3GPP Tdoc R1-081106, "Way Forward on Scrambling Sequence Initialisation", Nokia Siemens Networks, Nokia, Ericsson, Qualcomm, Samsung, Panasonic, Motorola, Feb. 2008.

3GPP Tdoc R1-093304, "Considerations on Initialization and Mapping of DM-RS Sequence", Nokia Siemens Networks, Nokia, Aug. 2009.

3GPP Tdoc R1-090875, "Further Considerations and Link Simulations on Reference Signals in LTE-A", Qualcomm, Feb. 2009.

International Search Report and Written Opinion, received in corresponding Patent Cooperation Treaty Application No. PCT/IB2010/002494. Dated Jan. 24, 2011. 15 pages.

"Impact of Downlink CoMP on the Air Interface", 3GPP TSG-RAN WG1, R1-090366; Jan. 12-16, 2009, Ljubljana, Slovenia; whole document.

3GPP TSG RAN WG1 Meeting #58bis; R1-093746; Miyazaki, Japan, Oct. 12-16, 2009 (78 pages).

3GPP TR 36.913 V8.0.1 (Mar. 2009) 3rd Generation Partnership Project; Technical Specification Group Radio Access Network; Requirements for further advancements for Evolved Universal Terrestrial Radio Access (E-UTRA) (LTE-Advanced)(Release 8) (15 pages).

3GPP TR 36.814 V0.4.1(Feb. 2009) 3rd Generation Partnership Project; Technical Specification Group Radio Access Network; Further Advancements for E-UTRA Physical Layer Aspects (Release 9) (31 pages).

3GPP TS 36.300 V8.6.0 (Sep. 2008) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) (137 pages).

\* cited by examiner

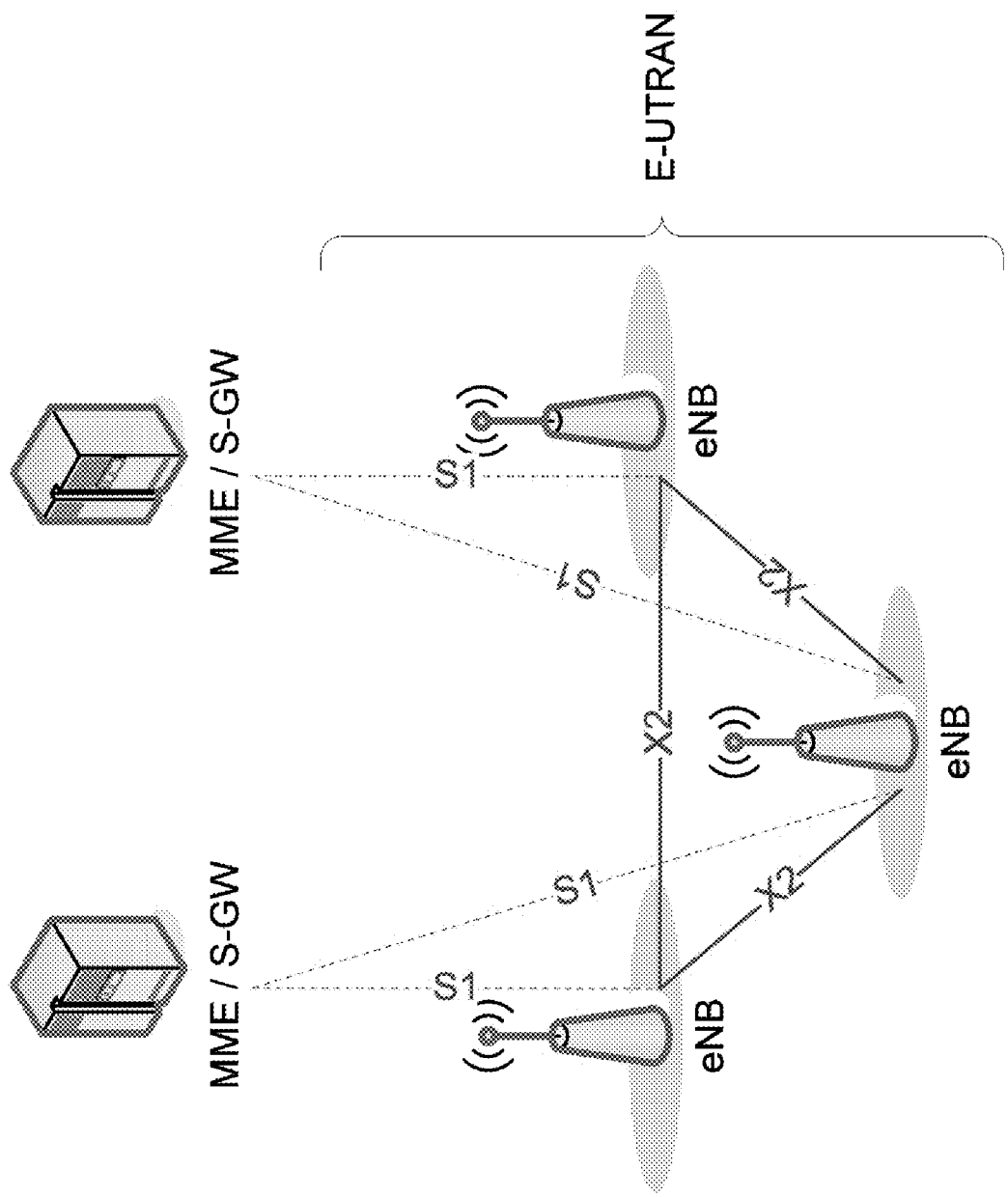
Fig 1: Prior Art

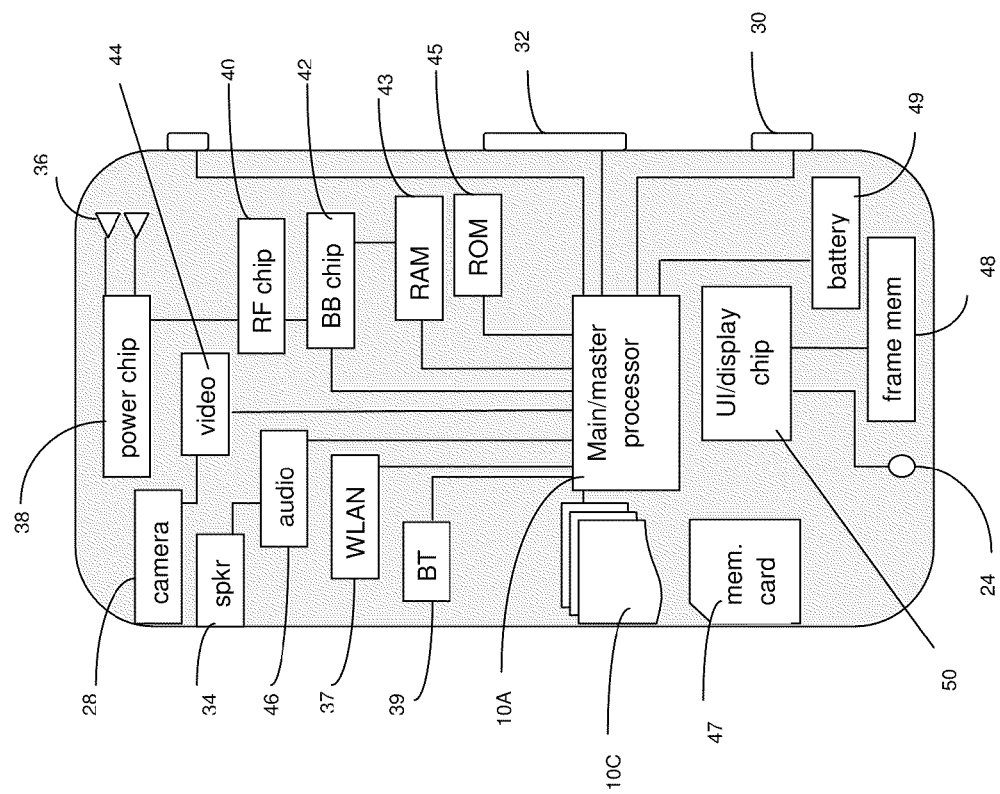
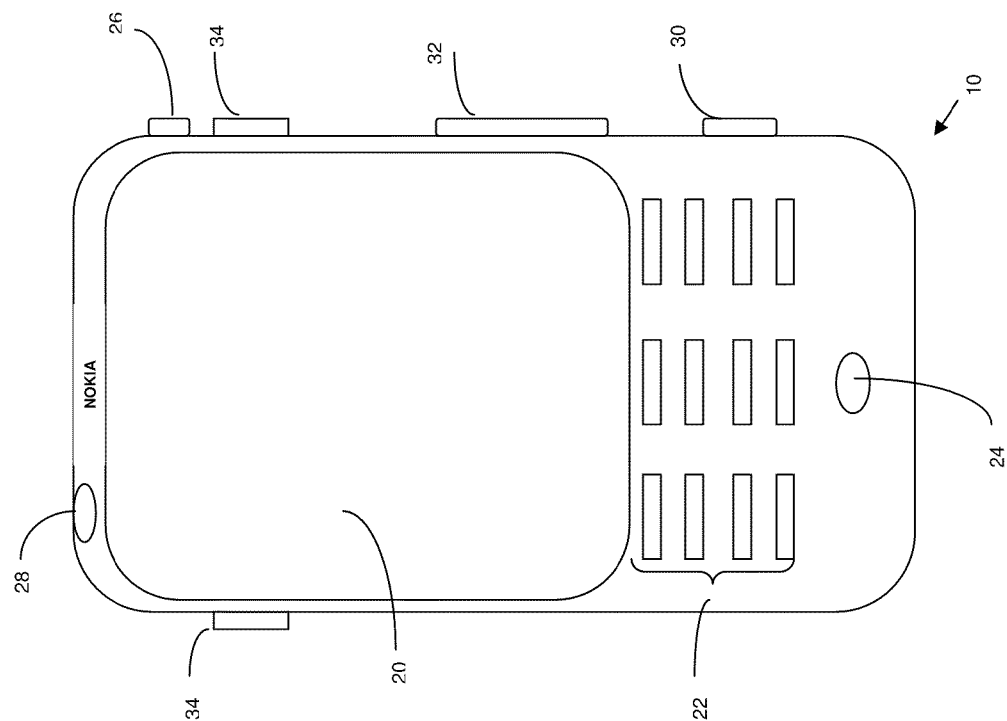
Figure 2B

INITIALIZATION OF REFERENCE SIGNAL SCRAMBLING

CROSS-REFERENCE TO RELATED APPLICATION

This application concerns subject matter related to that described at U.S. Provisional Patent Application 61/234,534, filed on Aug. 17, 2009. This application claims priority under 35 USC 119(e) to U.S. Provisional Patent Application Ser. No. 61/247,239, filed on Sep. 30, 2009. The contents of that priority application, including appendices thereto, are hereby incorporated into this application.

TECHNICAL FIELD

The exemplary and non-limiting embodiments of this invention relate generally to wireless communication systems, methods, apparatus/devices and computer programs and, more specifically, relate to the generation and use of reference signal scrambling codes.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ACK acknowledge
BPSK binary phase shift keying
CDM code division multiplexing
CoMP coordinated multi point transmission/reception
CRC cyclic redundancy check
CSI-RS channel state information reference signal
DCI downlink control information
DL downlink (eNB towards UE)
DM-RS demodulation RS
DRS dedicated reference signal
eNB EUTRAN Node B (evolved Node B, base station/access node)
EPC evolved packet core
EUTRAN evolved UTRAN (LTE)
FDM frequency division multiplexing
ID identity
JP joint processing
LTE long term evolution
LTE-A LTE-advanced
MAC medium access control
MIMO multiple input multiple output
MU multi user
MM/MME mobility management/mobility management entity
NACK not acknowledge/negative acknowledge
OFDMA orthogonal frequency division multiple access
O&M operations and maintenance
PDCP packet data convergence protocol
PHY physical
PRB physical resource block
PCI physical cell ID
PDCCH physical downlink control channel
PDSCH physical downlink shared channel
RB radio bearer
RE resource element
Rel release
RLC radio link control
RRC radio resource control
RS reference signal
SC-FDMA single carrier, frequency division multiple access
SU single user
S-GW serving gateway
TPMI transmitted precoding matrix indicator
TTI transmission time interval
UE user equipment
UL uplink (UE towards eNB)
URS UE specific reference signals
UTRAN universal terrestrial radio access network A communication system known as evolved UTRAN (EUTRAN, also referred to as UTRAN-LTE or as E-UTRA) is currently under development within the 3GPP. As presently specified the DL access technique will be OFDMA, and the UL access technique will be SC-FDMA.

One specification of interest is 3GPP TS 36.300, V8.6.0 (2008-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4.1 of 3GPP TS 36.300, and shows the overall architecture of the E-UTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (S-GW) by means of a S1 interface. The S1 interface supports a many to many relationship between MMEs/Serving Gateways and eNBs.

The eNB hosts the following functions:
 functions for Radio Resource Management: Radio Bearer Control, Radio Admission Control, Connection Mobility Control, Dynamic allocation of resources to UEs in both uplink and downlink (scheduling);
 IP header compression and encryption of the user data stream;
 selection of a MME at UE attachment;
 routing of User Plane data towards Serving Gateway;
 scheduling and transmission of paging messages (originated from the MME);
 scheduling and transmission of broadcast information (originated from the MME or O&M); and
 a measurement and measurement reporting configuration for mobility and scheduling.

Of particular interest herein are the further releases of 3GPP LTE targeted towards future IMT-A systems, sometimes termed Rel. 10 and referred to herein for convenience simply as LTE-Advanced (LTE-A). Reference may be made to 3GPP TR 36.913, V8.0.1 (2009-03), 3rd Generation Partnership Project; Technical Specification Group Radio Access Network; Requirements for Further Advancements for E-UTRA (LTE-Advanced) (Release X). Reference may also be made to 3GPP TR 36.814, v1.0.0 (2009-02), 3rd Generation Partnership Project; Technical Specification Group Radio Access Network; Further Advancements for E-UTRA Physical Layer Aspects (Release X).

There is a work item in LTE-A concerning the "Enhanced DL transmission for LTE" in Rel-9 and currently specified in 3GPP. For LTE-A, the design of the downlink UE-specific reference signal in support of CoMP (sometimes also referred to as C-MIMO) and MU-MIMO is discussed. URSs (also known as DRS and referred to as DM-RS within the context of LTE-A) were agreed to be used as the demodulation reference signal in the DL of Rel-10 and Rel-9, as is detailed at the above referenced 3GPP TR 36.814 as well as 3GPP WID RP-090359, "Enhanced DL transmission for LTE" (attached to the priority document U.S. provisional patent application no. 61/247,239, filed Sep. 30, 2009, as Exhibit A). This DM-RS is only present in the assigned PRBs and for the transmitted spatial layers. It undergoes the same precoding operation (e.g. precoding vectors) as the corresponding data channel (i.e. PDSCH). The prominent benefits of PDSCH demodulation based on URS are non-constrained precoding vectors, no need for TPMI signaling in the downlink and hence reduced overhead compared to PDSCH demodulation based on non-precoded common reference signals (CRS).

CoMP and/or MU-MIMO is expected in Rel9 and Rel10 of LTE (or sometime referred as LTE-Advanced) to achieve high cell-edge and cell average throughput gains. The initialization and mapping of URS in LTE Rel-8 use a 1 subframe (1 ms) re-initialization period (sequence periodicity=one radio frame, 10 ms); the sequence is QPSK Gold which is initialized with the UE ID, the Cell ID and the subframe number; and is mapped to the URS REs in frequency-first and time-later manner in the allocated PRBs of a subframe.

Herein lays a problem. The above properties imply that the sequences transmitted from different cells will be different. However, in case of JP CoMP transmission, transmission points from multiple cells might participate in the transmission to a single, or more relevantly to the problem to multiple UEs sharing the same time-frequency resources (sharing PRBs). At detailed at document 3GPP Tdoc R1-093746, "Draft Report of 3GPP TSG RAN WG1 #58 v1.0.0 (Shenzhen, China, 24$^{th}$-28$^{th}$ August, 2009)", by MCC Support (attached to the priority document as Exhibit B), the CDM-based DM-RS structures were agreed for both rank 1 and rank 2 transmissions of LTE Rel9 and LTE-Advanced. In case of multi-user JP CoMP, it might happen that two users receiving their PDSCH from multiple cells but with different serving cells are SDM multiplexed into the same time-frequency resources. Considering the above decision on the CDM-based DM-RS, the dedicated reference signals of these UEs will be code multiplexed. This requires that the orthogonal RS codes of the paired UEs are different to allow for spatial multi-user interference suppression at the UE, while the overlaying scrambling code is common Therefore, the cell ID (the PCI) cannot be used in the initialization of such an RS, else there would be different RS scrambling codes for the paired UEs. On the other hand, since the length of the CDM code for DM-RS is only two, this limits the number of orthogonal RS codes to be two. One way to increase the number of orthogonal RS codes is to increase the length of CDM code which requires more resources or to use quasi orthogonal RS codes.

Relevant to these teachings are the following further documents. 3GPP Tdoc R1-093304, "Considerations on Initialization and Mapping of DM-RS Sequence", by Nokia Siemens Networks, Nokia (attached to the priority document as Exhibit C) discusses the problem of providing a DM-RS that is invariant to the UE's ID and its PRB allocation to support CDM-based DM-RS between SDM users and/or to support MU interference tracking/suppression. 3GPP Tdoc R1-090875, "Further Considerations and Link Simulations on Reference Signals in LTE-A", by Qualcomm (attached to the priority document as Exhibit D) notes that the URS (i.e. DM-RS) sequence should be common to all cells participating in multi-cell transmission (CoMP transmission points) to a UE (for joint transmission/processing). However, that document does not specify an exact solution. Also relevant to these teachings is 3GPP Tdoc R1-081106, "Way Forward on Scrambling Sequence Initialisation", by Nokia Siemens Networks, Nokia, Ericsson, Qualcomm, Samsung, Panasonic, Motorola (attached to the priority document as Exhibit E).

SUMMARY

In a first aspect thereof the exemplary embodiments of the invention provide a method comprising: initializing a scrambling sequence using a cell identifier and an offset; and sending a physical downlink control information to a user equipment which indicates the offset.

In a second aspect thereof the exemplary embodiments of the invention provide an apparatus comprising at least one processor and at least one memory storing computer program code. The at least one memory storing the computer program code is configured with the at least one processor to cause the apparatus at least to perform: initializing a scrambling sequence using a cell identifier and an offset; and sending a physical downlink control information to a user equipment which indicates the offset.

In a third aspect thereof the exemplary embodiments of the invention provide a memory storing computer program code that when executed by at least one processor result in operations comprising: initializing a scrambling sequence using a cell identifier and an offset; and sending a physical downlink control information to a user equipment which indicates the offset.

In a fourth aspect thereof the exemplary embodiments of the invention provide a method comprising: receiving a physical downlink control information which indicates an offset; and initializing a scrambling sequence using a cell identifier and the indicated offset.

In a fifth aspect thereof the exemplary embodiments of the invention provide an apparatus comprising at least one processor and at least one memory storing computer program code. The at least one memory storing the computer program code is configured with the at least one processor to cause the apparatus at least to perform: receiving a physical downlink control information which indicates an offset; and initializing a scrambling sequence using a cell identifier and the indicated offset.

In a sixth aspect thereof the exemplary embodiments of the invention provide a memory storing computer program code that when executed by at least one processor result in operations comprising: receiving a physical downlink control information which indicates an offset; and initializing a scrambling sequence using a cell identifier and the indicated offset.

BRIEF DESCRIPTION OF THE DRAWINGS

FIG. 1 reproduces FIG. 4 of 3GPP TS 36.300, and shows the overall architecture of the E-UTRAN system.

FIG. 2B shows a more particularized block diagram of a user equipment such as that shown at FIG. 2A.

DETAILED DESCRIPTION

Figure 2A:
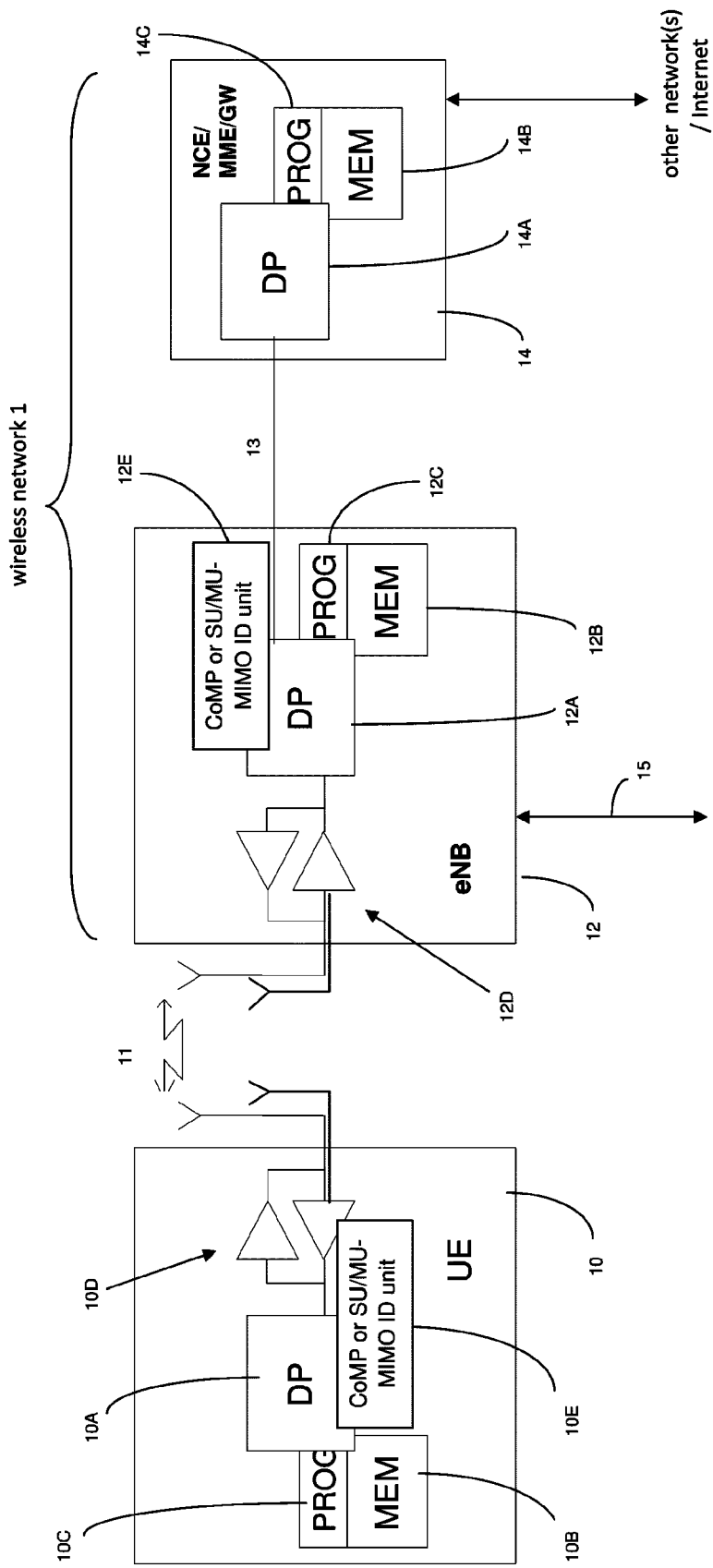
FIG. 2A shows a simplified block diagram of various electronic devices that are suitable for use in practicing the exemplary embodiments of this invention.

Further to the problem outlined above, according to these teachings there is a joint processing identifier that is derived from identifiers for a set of transmission points where a single transmission point is a special case, and such a joint processing identifier is termed herein a CoMP ID, without loss of generality. The CoMP ID is used for initializing scrambling sequences of the DM-RS used for the corresponding PDSCH demodulation at UEs. The identifiers from which the CoMP ID is derived or determined include at least the cell IDs in the cooperative area.

The description below uses as exemplary but non-limiting embodiments the joint transmission/joint processing variant of CoMP (i.e., JP CoMP), because it is the most sophisticated CoMP type among the schemes considered in 3GPP TR 36.814 v1.0.0 and offers potentially the highest gains. But in a more general manner, the exemplary embodiments of the invention detailed herein provide scrambling codes that are common to multiple cells (where single cell is a special case) having different cell IDs, and which can be used for example as the scrambling code for CDM-based DM-RS in case of multi point transmission (where single point transmission is a special case). Unlike the prior art teachings above, the non-limiting exemplary embodiments detailed below provide exact solutions to the requirement for a RS sequence that is common to all cells participating in multi-cell transmission (where single-cell transmission is a special case).

One solution to achieve different orthogonal RS codes of the paired UEs (i.e. multi-users) and also a common overlaying scrambling code from a set of CoMP IDs is to signal a CoMP ID semi-statically (e.g., via dedicated RRC signaling or common/broadcasted system information signaling) and initialize/map the multi-cell URS scrambling sequence accordingly. But recall from the background above that the PDSCH demodulation based on URS and non-constrained precoding vectors eliminate the need for DL TPMI signaling as compared to PDSCH demodulation based on non-precoded common reference signals (CRS), and so while signaling the scrambling codes solves the problem, below are detailed more elegant solutions which do not eliminate or overly limit the control signaling savings which are gained by using a URS in the first place.

In a first solution first it is determined which cells are participating in joint transmission, then the identifiers of those determined cells are combined with a predefined logic and a predefined function is executed on the logical combination to achieve a coordinated multipoint transmission identifier. The scrambling sequence is then generated with the coordinated multipoint transmission identifier and perhaps together with other parameters which are not specific/dependent on transmission point(s).

In a second solution, from the UE's perspective, there is an indication received via wireless signaling of at least one cell that is used in a joint transmission where a single-cell transmission is a special case. As will be detailed below, the indication can be for only one of the multiple cells used in the joint transmission or the indication can be for some plural number of the multiple cells used in the joint transmission. The identifier(s) of each signaled cell (where single-cell is a special case) are combined with a predefined logic and a predefined function is executed on the logical combination to achieve a coordinated multipoint transmission identifier, and the scrambling sequence is then generated with the coordinated multipoint transmission identifier and perhaps together with other parameters which are not specific/dependent on transmission point(s).

The two solutions noted above are generalized as a) determining cells participating in joint transmission; b) deriving a coordinated multipoint transmission identifier from identifiers of a predetermined set of the determined cells; and c) generating a scrambling sequence with the coordinated multipoint transmission identifier. The second solution above has an additional step prior to b) of signaling the indication (sending from the network and receiving at the UE).

These two different solutions are not mutually exclusive; certain aspects of them both may be combined in a practical solution without departing from these teachings. While these two solutions are detailed below with particularity, with respect to FIGS. 2A-B there are described exemplary and non-limiting apparatus/devices which may be used to practice and/or to embody various aspects of these inventive solutions, such as for example in the environment set forth at FIG. 3.

In FIG. 2A a wireless network 1 is adapted for communication over a wireless link 11 with an apparatus, such as a mobile communication device which may be referred to as a UE 10, via a network access node, such as a Node B (base station), and more specifically an eNB 12. It will be appreciated that the functions of the described eNB 12 may be conducted by a relay node, such as a type 1 relay in LTE-A which has control over its own cell and which appears to the UE 10 as the eNB 12. The network 1 may include a network control element (NCE) 14 that may include the MME/S-GW functionality shown in FIG. 1, and which provides connectivity with another broader network, such as a telephone network and/or a data communications network (e.g., the internet). The UE 10 includes a controller, such as a computer or a data processor (DP) 10A, a computer-readable storage medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the Si interface shown in FIG. 1. The eNB 12 may also be coupled to another eNB via data/control path 15, which may be implemented as the X2 interface shown in FIG. 1.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a CoMP ID or SU/MU-MIMO unit 10E, and the eNB 12 may include a CoMP ID or SU/MU-MIMO unit 12E. These processing units 10E, 12E generate the CoMP ID or SU/MU-MIMO ID according to the exemplary and non-limiting embodiments detailed below from which the scrambling code is generated. While shown as separate and distinct units 10E, 12E in FIG. 2A, the physical processor which generates the CoMP ID or MU-MIMO ID may in certain embodiments be performed by another processor within the apparatus/device 10, 12 such as the DP 10A, 12A or other inferior/subordinate/ slaved processors.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 2B illustrates further detail of an exemplary UE in both plan view (left) and sectional view (right), and the invention may be embodied in one or some combination of those more function-specific components. At FIG. 2B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 2B are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

An exemplary UE 10 may also include a camera 28 and image/video processor 44, a separate audio processor 46 for outputting to speakers 34 and for processing inputs received at the microphone 24. The graphical display interface 20 is refreshed from a frame memory 48 as controlled by a user interface chip 50 which may process signals to and from the display interface 20 and/or additionally process user inputs from the keypad 22 and elsewhere. Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 10E/12E, 38, 40, 42, 44, 46, 50, if embodied as separate entities in a UE 10 or eNB 12, may operate in a slave relationship to the main processor 10A, 12A, which may then be in a master relationship to them. Any or all of these various processors of FIG. 2B access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 2B.

Note that the various chips (e.g., 10E/12E, 38, 40, 42, etc.) that were described above may be combined into a fewer number than described and, in a most compact case, may all be embodied physically within a single chip.

Figure 3:
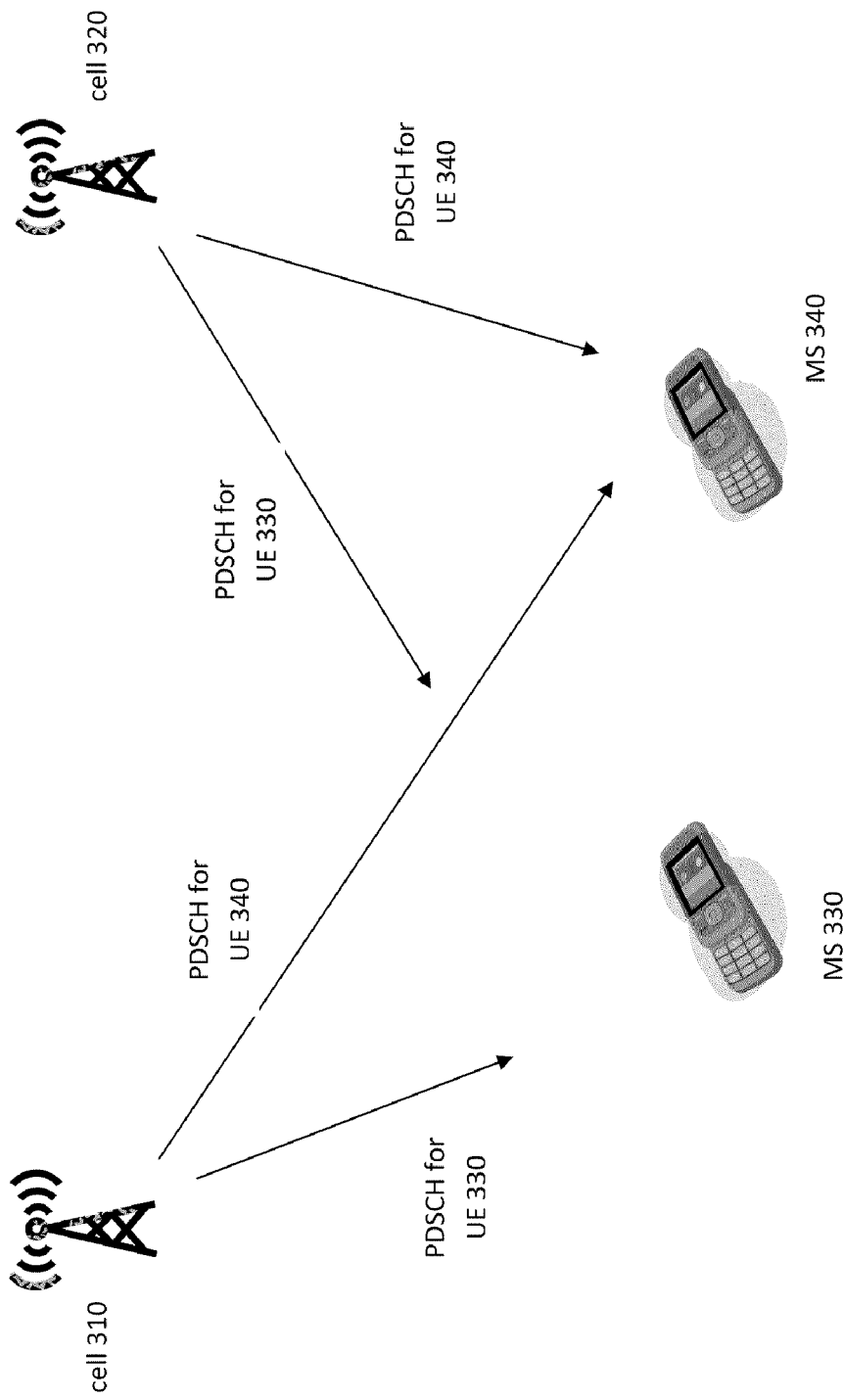
FIG. 3 illustrates an example CoMP environment with two cells either each jointly or separately transmitting to two mobile stations/user equipments.

FIG. 3 illustrates an exemplary CoMP and MU-MIMO environment. Shown by example are two network transmitter points denoted as cell 310 and cell 320 (though more than two may be present) engaging in either jointly and separately processed transmissions to the illustrated two mobile stations MSs/UEs denoted as MS 330 and MS 340. Also note that each of the UEs may receive transmissions from a different set of transmitters, with one or some or none of the transmitting points in common. The cells 310, 320 may be any combination of eNB, relay node, or remote transmission point (i.e. remote radio head) of an eNB or relay node, so long as each has a single or a limited set of unique identifier(s) and their transmissions for purposes of these teachings are coordinated for multiple MSs/UEs either between eNBs or within each eNB. Embodiments of the transmitting points 310, 320, whether eNB or otherwise, may be similar to the eNB 12 illustrated at FIG. 2A.

By example, cell 310 sends a PDSCH for MS 330 and cell 320 also sends the same PDSCH for MS 330; and cell 310 sends a PDSCH for MS 340 and cell 320 also sends the same PDSCH for MS 340. All four of those PDSCH transmissions are multiplexed to the same PRB and space division multiplexed, and each has a UE specific RS which the receiving UE uses to demodulate/decode the PDSCH. That is, the PDSCH transmissions from cell 310 and from cell 320 to the same UE will use the same DM-RS, which is specific to that UE and so different from the DM-RS which is used for the joint transmissions to the other UE.

Independent from being single-cell transmission or multi-cell transmission, each cell 310, 320 uses a different spreading and/or scrambling code for its DM-RS and PDSCH transmissions to the different UEs (i.e. MU-MIMO), by example shown in FIG. 3 two cells 310 and 320 are jointly and simultaneously transmitting to both MS 330 and MS 340. The PDSCH from cell 310 to MS 330 uses the same scrambling code as the PDSCH from cell 320 to MS 330, and similarly the PDSCH from cell 310 to MS 340 uses the same scrambling code as the PDSCH from cell 320 to MS 340 but those two scrambling codes are different and quasi-orthogonal to one another to randomizing the mutual interference and potentially allows also spatial multi-user interference suppression. Alternatively, the DM-RS from cell 310 to MS 330 uses the same spreading and scrambling codes (assuming CDM-ed DM-RS as described in background, but not limited to CDM-ed DM-RS) as the DM-RS from cell 320 to MS 330, and similarly the DM-RS from cell 310 to MS 340 uses the same spreading and scrambling code as the DM-RS from cell 320 to MS 340 but those two set of spreading(/scrambling) codes are different and orthogonal (or quasi-orthogonal) to one another to assure spatial multi-user interference suppression. Conventionally, the scrambling code is initiated with the transmitting cell ID, so the conventional method for scrambling code generation is unworkable for CoMP or multi-cells multi-users transmission because each cell has different cell ID or identifier as shown at FIG. 3.

Above it was stated that the two different solutions can be generalized as determining cells participating in joint transmission; deriving a coordinated multipoint transmission identifier from identifiers of a predetermined set of the determined cells; and generating a scrambling sequence with the coordinated multipoint transmission identifier.

Following are examples for the first solution summarized above. Each UE knows the set of cells which are to transmit to it using CoMP or SU/MU-MIMO, and knows all of the IDs (which can be for example cell ID or any other unique identifier(s) corresponding to the transmission point(s) or cell(s)) of those CoMP cells. This is because the UE conducts measurements of received signals and sends regular periodic reports in the form of specified measurement quantities (or on-demand reports when the network requests them) to at least one of the cells 310, 320. This is termed in LTE-A as a CoMP reporting set, or alternatively sometimes referred to as the CoMP measurement set or as simple as measurement set. All of the cells in that set are also aware of all other cells conducting CoMP to the same UE, since they must coordinate their transmissions to send the same DM-RS/PDSCH and use the same spreading and/or scrambling code as above. At least in LTE-A, simply reporting the measurement quantities of a set of cells does not guarantee to the UE that all of them will be engaged in the next CoMP or SU/MU transmission. In that case there might be signaling (e.g., semi-statically via dedicated RRC signaling, dynamically via PDCCH, or any other form of signaling between eNB and UE) to the UE to inform it of its CoMP transmitting set. This is not an additional signaling overhead since the UE must be assured it has the right set regardless of how the scrambling code is generated, and in LTE-A the CoMP reporting set is sent to the UE to inform it what cells to measure. The above demonstrates how the UE and the CoMP cells determine all of the cells participating in joint transmission to a particular UE.

Knowing the IDs of those cells, all of those cell IDs are first combined with a predefined logic, and then a predefined function is executed on the logical combination to achieve a coordinated multipoint transmission identifier CoMP ID. This is how the coordinated multipoint transmission identifier is derived from identifiers of a predetermined set of the determined cells. In this example for the first solution the predetermined set is all CoMP cells in the CoMP reporting set for a particular UE. The scrambling sequence or scrambling code, which the cells 310, 320 use in their PDSCH and DM-RS transmission to the same designated UE and which the receiving UE 330 or 340 uses to demodulate its received PDSCHs and estimate the undergone radio channel from DM-RS with a known scrambling sequence and spreading code from the CoMP cells, is then generated or initialized with the coordinated multipoint transmission identifier and perhaps generated together with other parameters which are not specific/dependent on transmission point(s).

While not limiting, three examples are presented of how the cell IDs can be logically combined, and the function executed on the combination to arrive at the CoMP ID. A unique, one-to-one mapping might not be the most robust solution for LTE-A (already all combinations of 3 cells out of 504 LTE Rel-8 PCIs require 25 initialization bits while 4 cells are not possible considering the fact the LTE Gold Code generator has a 31 bit initialization space), though of course it may be practical in other wireless systems. In an exemplary but non-limiting embodiment, the function executed on the CoMP ID is a hashing between combinations of cell IDs in the CoMP reporting set, which generates the CoMP ID. In an exemplary but non-limiting embodiment, the logical combination of the cell IDs is a concatenation with an ascending or descending order.

As a first example, the CoMP ID is generated by concatenating all of the cell IDs of the whole set of CoMP transmitting points/cells, in a specific order that is pre-determined but alternatively which could be established via signaling, and then calculate a CRC (e.g. CRC-10) or other predefined polynomials to generate the CoMP ID. As a second example, the CoMP ID is generated by concatenating all of the cell IDs of the whole set of CoMP cells, and the CoMP ID is calculated by executing a modulo function [e.g., (Cell IDs_concatenated) mod X, where for example X=1023]. As a third example, either of the two above examples can be further modified using an optionally signaled offset to the above CoMP ID. This gives the network 1 flexibility to more positively assure that collisions can be avoided via planning, or to alter the CoMP ID for some other reason that may arise. Note that the offset option is not limited to the two specific examples given above, which themselves are not limiting.

There is another variation for the first solution to derive the CoMP ID. Instead of hashing as above, only one of the cell IDs is used, and it is selected from among the CoMP reporting set in a predetermined manner so that both network cells and UE can conduct similar operations without extra signaling. For example, the scrambling sequence can in one embodiment always be generated based on the smallest cell ID value within the CoMP Reporting Set, or in another embodiment based on the largest cell ID value. To avoid a possible randomization issue when partly overlapping CoMP Reporting Sets have a common cell with the largest/smallest PCI as would be the case with FIG. 3, there can be an optionally signaled offset to the selected cell ID as noted above. In this variation for the first solution the predetermined set of determined CoMP cells from which the CoMP ID is derived is a set of one cell, that with the smallest/largest cell ID.

Following are examples for the second solution summarized above. The CoMP ID is derived from a signaled indication of at least one of multiple cells used in a joint transmission where a single-cell transmission is a special case, and the identifier of each signaled cell (where single-cell is a special case) are combined with a predefined logic and a predefined function is executed on the logical combination to achieve the CoMP ID. From the cell's perspective it transmits the signaling (at least one of the cells 310, 320 transmits it); from the UE's perspective it receives the signaling, which in an embodiment is downlink control information (DCI) (i.e. some number of bits included into the downlink grant PDCCH) signaling. The bits define what scrambling of the DM-RS (and possibly PDSCH) shall be used by the UE so that this scrambling initialization can change on a TTI-to-TTI basis. Four examples are detailed for this DCI signaling: the DCI signaling can be a bitmap of selected transmission points/cells; and/or the DCI signaling can be an index to a cell from a configured CoMP Reporting Set (where only the cell ID corresponding to the signaled index is used as the CoMP ID); and/or what may be signaled is an indication whether the UE's recommendation on the set of transmission points/cells was followed or overridden by the network ; and/or an offset (or as simple as a switch between) of the predefined scrambling sequences or the predefined identifiers from which unique scrambling sequence is generated. The offset method is not limited by the methods deriving the predefined scrambling sequence set and/or identifier set which could be for example statically defined, or semi-statically signaled, or derived from any other methods (for example described above).

In the first example for the second solution, there is a bitmap of transmission points/cells 310, 320. Each bit corresponds to one of the cells in the CoMP Reporting Set, and indicates if the corresponding cell is used or not for transmission. Based on the actual PCIs of the dynamically indicated transmission points, the UE can derive the CoMP ID in a similar way as given by the various examples above for the first solution. So for example if there are three CoMP cells in the reporting set, DCI bit sequence 011 may indicate to include the IDs of the second and third cells but to exclude the ID of the first cell which maps from those bits.

In the second example for the second solution, the DCI bits signal an index to a cell from the configured CoMP Set. All cells in the CoMP Reporting Set are indexed, and the signaled index points to just one PCI that is used as the CoMP ID for generating the scrambling sequence. So for example the bit sequence 011 signaled as the index pointer may point to the fourth cell in the indexed list, and the transmission points and the UE would use the ID of that fourth cell as the CoMP ID.

In the third example for the second solution, the DCI bit(s) signal whether or not the CoMP reporting set which will be used by the network for the next CoMP transmission is the same as that recommended by the UE. For example, bit value "0" indicates override of the UE's recommendation for the CoMP set and bit value "1" indicates confirmation that the UE's recommendation for the CoMP set will in fact be used on the next CoMP transmission to that UE. If the recommendation is confirmed, the UE can derive the CoMP ID as noted in any of the various examples above (except the single index pointer) because it knows the PCIs of the transmission points. If the recommendation is overridden, the network can inform the UE via additional signaling about the actual transmission point(s), which need only signal the differences over the UE's recommended set or the actual transmission point(s) might fall-back to some predetermined set. The derivation of the CoMP ID will then be made with the actual set in the same manner as if the UE's recommendation were approved (e.g., concatenate, smallest/largest, etc.).

In the fourth example for the second solution, each cell or CoMP cell corresponds to a few number of scrambling sequence or methods/identifiers to initialize the scrambling sequences. The DCI bits signal an offset or an index that points to just one scrambling sequence or methods/identifier to initialize the scrambling sequence corresponding to the derived cell or CoMP cell which could be derived but not limited by e.g. the methods described above.

The above examples are non-limiting and are presented to give a more thorough understanding of the invention. Note also that these teachings are not limited only to generating a CoMP ID for a DM-RS; they can be used also for scrambling multi-cell CSI-RSs in case a CDM component is used to separate cells or transmission points.

Figure 4:
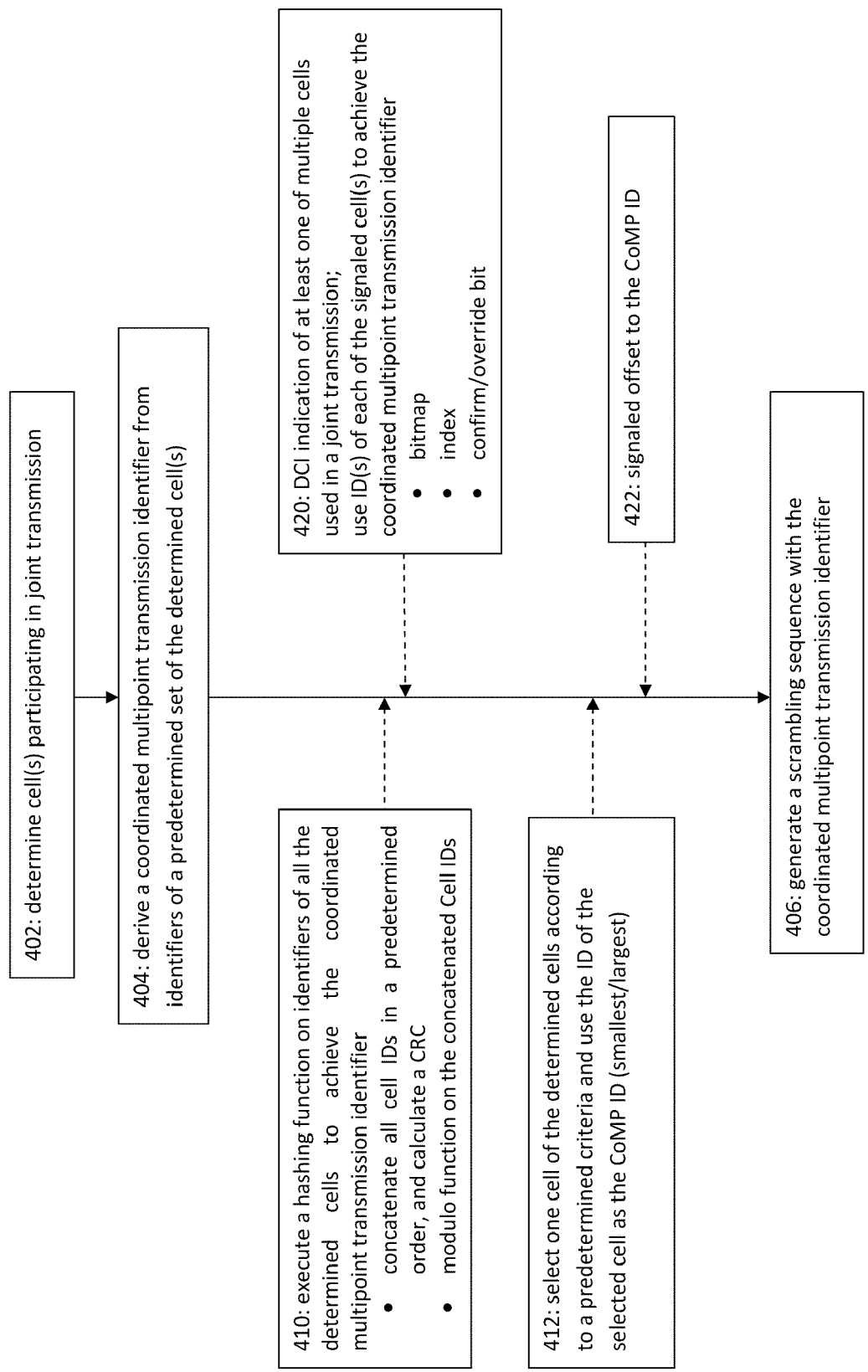
FIG. 4 is a logic flow diagram that illustrates the operation of a method, and a result of execution of computer program instructions embodied on a computer readable memory, in accordance with the exemplary embodiments of this invention.

A technical effect of the first solution is that in some cases no signaling is needed, the CoMP IDs are assigned automatically or uniquely determined at the UE without additional signaling overhead. A technical effect of the second solution is that fast ID changes and dynamic UE pairing are possible (e.g., so long as the paired UEs have at least one cell in common in their Reporting Sets), though the second solution does require some PDCCH signaling overhead as outlined by the four examples for it above. Since the joint transmission could for example be single or multi-transmission points transmitting to multiple reception points as noted above, the term CoMP ID can be generalized as a coordinated ID FIG. 4 is a logic flow diagram that illustrates the operation of a method, and actions performed by a processor as a result of executing a computer program stored on a computer readable memory, in accordance with the exemplary embodiments of this invention. In accordance with these exemplary embodiments a method performs, at block 402, a step of determining cell(s) participating in joint transmission (the joint transmission could for example be single or multiple transmission points transmitting to multiple reception points), and at block 404 deriving a coordinated multipoint transmission identifier (or simply a coordinated identifier) from identifiers of a predetermined set of the determined cell(s), and at block 406 generating a scrambling sequence with the derived coordinated multipoint transmission identifier (coordinated identifier). Blocks 402, 404 and 406 may be performed by a processor, and following generating the scrambling sequence the network cell sends a transmission which is scrambled with the scrambling sequence in coordination with others of the determined cells, while the UE uses the generated scrambling sequence to unscramble a joint transmission received from some and preferably all of the determined cells.

In a particular embodiment the transmission in a wireless network typically consists of data part transmission (e.g. PDSCH) and the associated pilot part transmission (a.k.a. Reference Signal, e.g. CRS or DRS), both parts of the transmission are scrambled with a mutual known (e.g. predefined, predetermined, or signaled, etc.) scrambling sequence. In case of CoMP/coordinated joint transmission (the joint transmission could for example be single or multi-transmission points transmit to multi-reception points), the scrambling sequence applied on PDSCH from all involved transmission point(s) to the same reception point (i.e. MS or UE) should be the same, though the scrambling sequence applied on PDSCH to different reception points (i.e. MS or UE) can be different and in a particular embodiment they are different; however the scrambling sequences, which are applied on DRS of each reception point (which are SDM-ed onto same time-frequency resources, i.e. sharing PRB(s) or MU-MIMO), should be for example identical to enable orthogonal DRS sequence after applying orthogonal spreading cover, or quasi-orthogonal (e.g. the scrambling sequences are generated from same polynomial but are initialized with different state). In a particular embodiment, the CoMP/coordinated ID is derived with at least one of the above mentioned solution(s) to initialize the scrambling sequence and potentially together with at least one of the other parameters (e.g. subframe index, UE ID, codeword index, sequence offset, etc.). For PDSCH, all involved transmission points use the same scrambling sequence for the same UE. For DRS, one needs to ensure that not only the scrambling sequence to the same UE is the same, but also the scrambling sequences to different UEs (which share PRB(s) or MU) are the same or quasi-orthogonal yet still allow dynamic change of the involved transmission points to each UE with zero or minimum signaling overhead.

In a particular embodiment of block 404 shown at block 410, deriving the CoMP ID/coordinated ID comprises executing a hashing function on identifiers of all of the determined cells to achieve the CoMP ID/coordinated ID, and the various examples for that detailed above are shown also at block 410 (concatenate all cell IDs in a predetermined order and calculate a CRC to generate the CoMP ID/coordinated ID; execute a modulo function on the concatenated Cell IDs and calculate the CRC after executing the modulo function).

In a particular embodiment of block 404 shown at block 412, deriving the CoMP ID/coordinated ID comprises selecting one cell of the determined cells according to a predetermined criteria and use the ID of the selected cell as the CoMP ID/coordinated ID, in which the predetermined criteria can be for example smallest cell ID of the CoMP reporting set, or largest, etc.

In a particular embodiment of block 404 shown at block 420, to the steps/actions at blocks 402 and 404 is added the additional step/action of signaling in DCI an indication of at least one of multiple cells used in a joint transmission (in which the network cell transmits the DCI signal and the UE receives it), and further deriving the CoMP ID/coordinated ID from block 404 is particularly embodied at block 420 as using an identifier of each of the signaled at least one of the multiple cells to achieve the coordinated multipoint transmission identifier. Three of the four examples of this are also briefly stated at block 420: the indication comprises a bitmap of transmission points/cells in which each bit corresponds to one of the cells in the CoMP Reporting Set and indicates if the cell is used or not in the derivation of the CoMP ID/coordinated ID; the indication comprises an index to one cell from the configured CoMP Reporting Set (the determined cells of block 402) and the one PCI corresponding to the index indication is used for scrambling sequence generation; and the indication comprises a bit that indicates confirm or override of the UE's recommendation of the actual transmission points.

In a particular embodiment of block 404 shown at block 422, which may optionally be combined with any of blocks 410, 412 and/or 422 and which covers the fourth example above, there is a signaled offset (sent by the network cell and received by the UE) which is applied to offset the CoMP ID/coordinated ID.

In an embodiment there is an apparatus, such as for example a network device 310, 320 or one or more components thereof such as a chipset, or for example a UE 330, 340 or one or more components thereof such as a chipset, comprising a processor and a computer readable memory which are configured to determine cells participating in joint transmission, derive a coordinated multipoint transmission identifier from identifiers of a predetermined set of the determined cells, and to generate a scrambling sequence with the coordinated multipoint transmission identifier. Such an apparatus may optionally further comprise a transceiver, which from the network perspective is configured to send a transmission which is scrambled with the scrambling sequence in coordination with others of the determined cells, and from the UE perspective such a transmitter is configured to receive a joint transmission from the determined cells and to use the generated scrambling sequence to unscramble the received joint transmission.

The various blocks shown in FIG. 4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the LTE-A system, it should be appreciated that the exemplary embodiments of this invention are not limited for use with only this one particular type of wireless communication system, and that they may be used to advantage in other wireless communication systems which may adopt CoMP in the future, such as for example WGA (Wireless Gigabyte Alliance, sometimes termed WirelessHD) or others.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g.,CoMP ID, CoMP Reporting Set, etc.) are not intended to be limiting in any respect, as these parameters may be identified by any suitable names. Further, the formulas and expressions that use these various parameters may differ from those expressly disclosed herein. Further, the various names assigned to different channels (e.g., PDCCH, PDSCH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   initializing a scrambling sequence using a cell identifier and a non-fixed offset; and
   sending a physical downlink control information to a user equipment which indicates the offset.

2. The method according to claim 1, further comprising sending a user equipment specific reference signal to the user equipment for demodulating a downlink shared channel, wherein the user equipment specific reference signal is scrambled by the scrambling sequence.

3. The method according to claim 1, wherein the physical downlink control information is transmitted on a physical downlink shared control channel (PDCCH).

4. An apparatus comprising:
   at least one processor; and
   at least one memory storing computer program code configured to, with the at least one processor, cause the apparatus at least to perform:
      initializing a scrambling sequence using a cell identifier and a non-fixed offset; and
      sending a physical downlink control information to a user equipment which indicates the offset.

5. The apparatus according to claim 4, wherein the memory storing computer program code is configured with the at least one processor to cause the apparatus at least to further perform: sending a user equipment specific reference signal to the user equipment for demodulating a downlink shared channel, wherein the user equipment specific reference signal is scrambled by the scrambling sequence.

6. The apparatus according to claim 4, wherein the offset corresponds to a single specific scrambling sequence.

7. The apparatus according to claim 4, wherein the physical downlink control information is transmitted on a physical downlink shared control channel (PDCCH).

8. The apparatus according to claim 4, wherein the cell identifier is selected from a set of coordinated multipoint transmission cell identifiers.

9. The apparatus according to claim 5, wherein the user equipment specific reference signal is sent to the user equipment in a pilot part of a subframe transmission associated with the physical downlink shared channel, and the user equipment specific reference signal is for demodulating at least a data part of the transmission associated with the physical downlink shared channel.

10. A memory storing computer program code that when executed by at least one processor result in operations comprising:
    initializing a scrambling sequence using a cell identifier and a non-fixed offset; and
    sending a physical downlink control information to a user equipment which indicates the offset.

11. The memory according to claim 10, the operations further comprising: sending a user equipment specific reference signal to the user equipment for demodulating a downlink shared channel, wherein the user equipment specific reference signal is scrambled by the scrambling sequence.

12. A method comprising:
    receiving a physical downlink control information which indicates a non-fixed offset; and
    initializing a scrambling sequence using a cell identifier and the offset.

13. The method according to claim 12, further comprising receiving a user equipment specific reference signal for demodulating a downlink shared channel, wherein the user equipment specific reference signal is scrambled by the scrambling sequence.

14. The method according to claim 12, in which the physical downlink control information is received on a physical downlink shared control channel (PDCCH).

15. An apparatus comprising:
    at least one processor; and
    at least one memory storing computer program code configured to, with the at least one processor, cause the apparatus at least to perform:
       receiving a physical downlink control information which indicates a non-fixed offset; and
       initializing a scrambling sequence using a cell identifier and the offset.

16. The apparatus according to claim 15, wherein the memory storing computer program code is configured with the at least one processor to cause the apparatus at least to further perform: receiving a user equipment specific reference signal for demodulating a downlink shared channel, wherein the user equipment specific reference signal is scrambled by the scrambling sequence.

17. The apparatus according to claim 15, wherein the offset corresponds to a single specific scrambling sequence.

18. The apparatus according to claim 15, wherein the physical downlink control information is received on a physical downlink shared control channel (PDCCH).

19. The apparatus according to claim 15, wherein the cell identifier comprises an identifier for one cell in a wireless network from which the downlink control information was received, and wherein the apparatus comprises a user equipment associated with a user specific reference signal that is scrambled by the scrambling sequence.

20. A memory storing computer program code that when executed by at least one processor result in operations comprising:
    receiving downlink control information which indicates a non-fixed offset; and
    initializing a scrambling sequence using a cell identifier and the offset.

21. The method according to claim 20, further comprising receiving a user equipment specific reference signal for demodulating a downlink shared channel, wherein the user equipment specific reference signal is scrambled by the scrambling sequence.

* * * * *